Aug. 24, 1937.　　T. R. ALLEY ET AL　　2,090,742
HULLER GIN
Filed July 14, 1934　　2 Sheets-Sheet 1

Inventors
Thomas R. Alley
Joseph D. Alley

By Hardway Cather
Attorneys

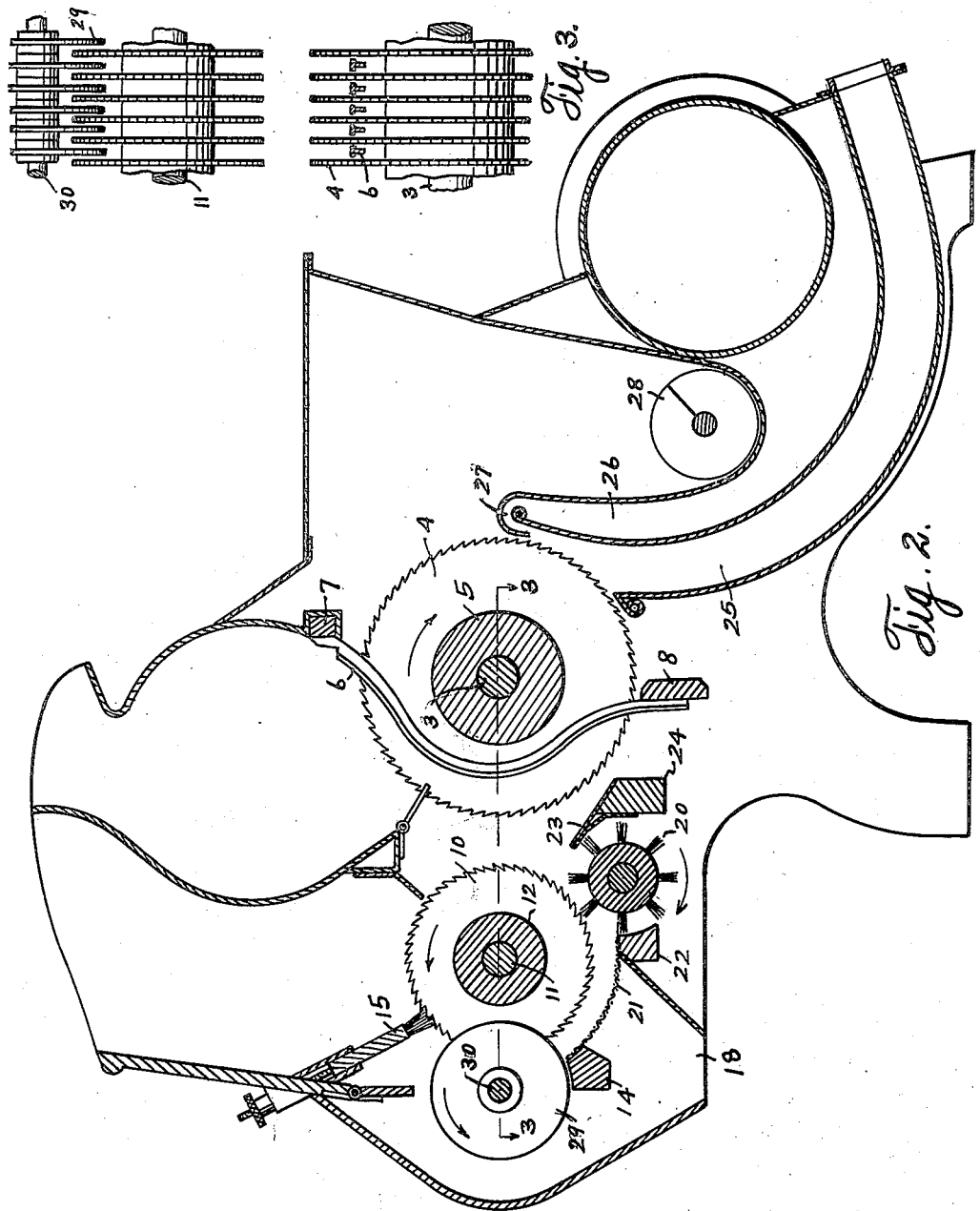

Patented Aug. 24, 1937

2,090,742

UNITED STATES PATENT OFFICE 2,090,742

HULLER GIN

Thomas R. Alley and Joseph D. Alley,
Alleyton, Tex.

Application July 14, 1934, Serial No. 735,176

3 Claims. (Cl. 19—56)

This invention relates to a huller gin and has particular relation to novel means for effectively cleaning hulls, trash and other foreign matter from seed cotton before the cotton comes into contact with the ginning saws.

In the conventional hulling gin now in common use the seed cotton mixed with hulls and trash is delivered onto a picker roller in the huller breast and is thrown into direct contact with the gin saws and in consequence any metal objects such as nails, wire or other hard substance in the cotton comes into direct contact with the gin saws before being expelled with the hulls from the huller breast, resulting in injury to said saws; also with the present type of huller gin in common use, the hulls often accumulate in the huller breast faster than they can be expelled from the huller breast, and while being retained in the huller breast, the saws operate on the accumulation and disintegrate foreign matter therein which passes directly into the breast of the gin and is mixed with the lint, thus greatly lowering the grade.

It is an object of this invention to provide a huller gin wherein the picker roller has not been used and means have been provided for separating the hulls, trash and foreign objects from the seed cotton before the same reaches the gin saws.

Another important feature of our invention lies in the fact that the conventional huller ribs, commonly used in all types of huller gins, are eliminated, thereby relieving the gin saws of a serious tendency to choke at the point where the said ribs curve outwardly from the periphery of the gin saws. The said gin saws pass between and leave the huller ribs at this point, and in ginning damp or green cotton there is a tendency for the seed cotton to adhere to the ribs and accumulate to such an extent that the passage between the ribs is entirely obstructed. When this occurs the roll in the ginning breast stops revolving thus interrupting the entire ginning process. Another serious disadvantage in the use of the conventional huller ribs lies in the fact that the hulls are separated from the seed cotton at the point as has been above described and when ginning cotton with a large accumulation of hulls and the like, the said hulls and trash at the point of separation are thrown outwardly and forwardly directly into the path of the seed cotton that is falling into the huller hopper from the feeder thus mixing the separated hulls with the cotton hulls and trash that is falling down from the feeder that is yet to be treated.

A further object is to provide a huller gin having a seed channel for the exit of the seed, said channel having ample capacity so as to eliminate the tendency of the seed to congest and clog said channel as is the case when the conventional huller ribs are used.

Another object is to provide in a huller gin, means for positively separating the seed from the hulls and for insuring the positive discharge of the seeds and hulls, unmixed, from the gin.

Another serious objection of huller gins heretofore used lies in the fact that the gin saw cylinder provides the only means of separation of the cotton from foreign matter as hereinbefore indicated and wherein the seed cotton is thrown into direct contact with the gin saw teeth, and by reason of the relative large diameter of the gin saws and the high peripheral speed thereof, the teeth are often damaged and broken by coming into contact with foreign objects in the seed cotton and the cotton fiber is injured by reason of the fact that it is pulled through between the conventional huller ribs at a high rate of speed by the gin saw teeth and consequently the hulls are partially disintegrated along with the trash and the like, and the hull shale, that is, the small particles of the exterior of the hulls and the disintegrated trash and other foreign matter is cut directly into the lint, thus lowering the grade of the cotton. This disadvantage is overcome in the present invention by the use of a huller saw cylinder of low peripheral speed and relatively small diameter used in combination with the radially adjustable brush, the revolving cylindrical brushes and the cleaner ribs combined in a manner to effectively separate the cotton from all foreign matter such as hulls, trash and other foreign objects that would tend to damage the gin saw teeth without injury to the staple and by presenting an even unobstructed flow of clean cotton to the gin saws thereby increasing the capacity of the latter by reason of the fact that the gin saws are used only for the purpose of separating the lint from the seed.

Another object of the invention resides in the novel construction whereby any character of seed cotton may be effectively handled whether the same be comparatively clean or contains a large proportion of hulls, bolls and foreign matter and trash.

Another novel feature of the invention consists in an adjustable brush arranged in front of the huller saws with a revolving cylindrical brush beneath the adjustable brush and in close proximity thereto. The adjustable brush is movable radially with respect to the huller saw cylinder and in practice is so adjusted that it will temporarily restrain any excess seed cotton that may fall down from the feeder and will force the cotton passing under it into engagement with the teeth of said huller saw cylinder while not exerting sufficient resistance to cause said teeth to engage and cut the hulls and will cause the hulls and other foreign matter to be loosened and partially separated from the cotton, the latter being securely engaged by the saw teeth passing directly under the cylindrical revolving brush.

Another object of the invention is to provide novel means for so retaining the hulls in cooperation with the huller saws that all of the fiber and undeveloped locks of cotton, that would otherwise be wasted, will be recovered and delivered to the gin saws.

A further important advantage of the invention herein described resides in the fact that it is capable of ready application to the type of gins now in common use.

With the above and other objects in view, the invention has particular relation to certain novel features of construction, operation and arrangement of parts, an example of which is given in this specification and illustrated in the accompanying drawings, wherein:

Figure 2 shows a longitudinal vertical sectional view of a modified form thereof, and Figure 3 shows a transverse fragmentary sectional view taken on the line 3—3 of Figure 2.

Figure 1:
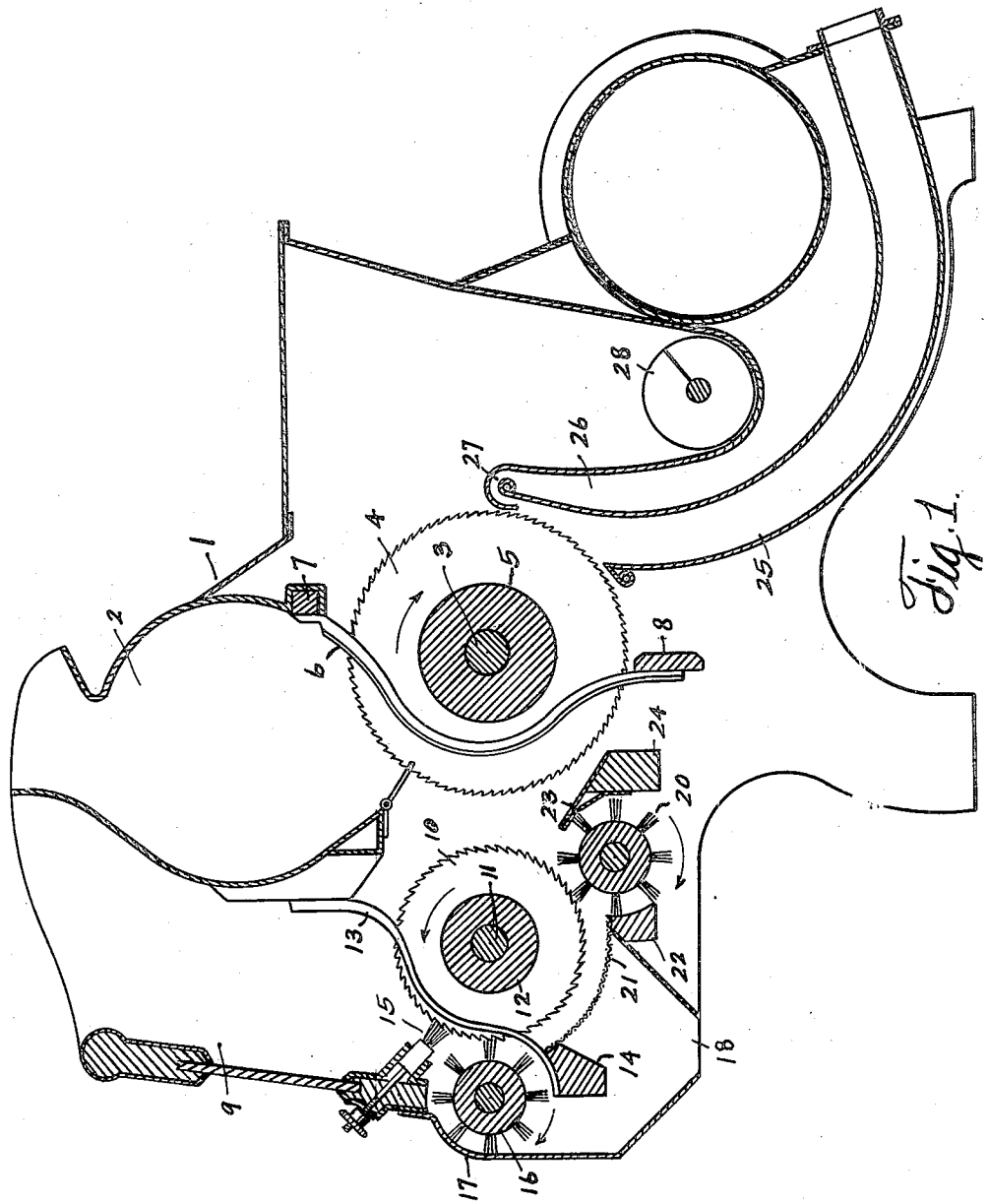
Figure 1 shows a longitudinal vertical sectional view of a huller gin illustrating the improvements.

Referring now more particularly to the drawings wherein like numerals of reference designate similar parts in each of the figures, the numeral 1 designates the casing of the gin as a whole which is of substantially the conventional construction. In the casing there is the roll box 2 provided to receive the roll of seed cotton from the huller. Beneath the roll box is the transverse shaft 3 on which the gang of gin saws 4, is mounted, said saws being spaced the required distance apart by the spacers 5. Between the saws 4 are the conventional stripper ribs 6 whose upper and lower ends are secured to the upper and lower cross bars 7 and 8 arranged above and beneath the saws 4, and the ribs 6 are curved forwardly and are arranged between said gin saws and are in front of the spacers 5. The seed cotton is delivered into the huller hopper 9 and arranged beneath this hopper is a gang of huller saws 10 which are aligned with and spaced in front of the gin saws 4. The saws 10 are fixed on the transverse shaft 11 and are maintained spaced apart by the spacers 12. They rotate in a direction the opposite of that of the gin saws 4 and work between the cleaner ribs 13 which are fixed at their upper ends to the forward wall of the roll box 2 and their lower ends to the transverse bar 14. These cleaner ribs are curved forwardly and arranged in front of the spacers 12. There is an adjustable brush 15 approximately equal in length to that of the huller saw cylinder. This brush cooperates with the huller saws and is adjustable radially relative thereto. This adjustable brush is arranged in front of the huller saw cylinder and arranged beneath it is the rotatable brush 16 which is enclosed in front by the housing 17. The brush 15 is so adjusted relative to the huller saws that it will temporarily restrain any excess amount of seed cotton that may fall down from the feeder into the hopper 9, and will force the cotton passing under it into engagement with the teeth of the huller saws but will not exert sufficient resistance to cause said teeth to engage or cut the hulls whereby the hulls and other foreign matter will be loosened and partially separated from the cotton and the latter, being in secure engagement with said teeth, will pass directly under the brush 16. This brush 16 is positioned within the outwardly curved discharge ends of the huller ribs 13 in close proximity to the huller saws and the brush 16 rotates in a direction the opposite of that of the huller saws and has a peripheral speed less than that of the huller saws and in practice the speed is so regulated that all hulls and foreign objects that accumulate above the cleaner ribs at the point where the huller teeth pass between said ribs will be discharged over the lower end of the latter but the hulls will be retained long enough for the huller saw teeth to pick out any small or undeveloped locks of cotton that would be otherwise wasted with the hulls. The hulls discharged over the lower ends of the ribs 13 pass out through the discharge hopper 18.

Beneath and in front of the huller saws there is a doffer brush 20 which is cylindrical in form and rotates in a direction the opposite of that of the huller saws. Spaced underneath the huller saws there is a transverse foraminated screen 21 whose forward margin is secured to the cross bar 14 and whose rear margin is secured to a cross bar 22 in front of the cylindrical doffer brush. The doffer brush 20 is shielded in the rear and above by shield 23 which is secured to the cross bar 24.

The cotton with the hulls disentangled therefrom passes between the cleaner ribs 13 and these ribs are so spaced with respect to the saws 10 that the cotton may readily pass between them but said ribs are spaced close enough together that they will prevent passage of an extraneous matter, such as hulls, metallic objects and the like that would tend to damage the gin saws. The seed cotton passes on over the screen 21 and any remaining foreign particles, dirt, trash and the like, may fall through said screen and as the cotton is doffed from the huller saws by the doffing brush 20 which rotates at a greater speed than the huller saws, to the end that the seed cotton will be thrown into contact with the gin saws and will be carried by them up into the roll box 2 where it is acted on in the usual manner.

The seed cotton in the roll box will be engaged by teeth of the saws 4 and carried through between the stripper ribs 6, and these ribs arrest the seed and the lint is stripped therefrom. The seed falls down and follows around the rib 6 and drops out of the gin.

There is a lint duct 25 which leads from the rear of the gin saws to a suitable lint flue not shown but by which the lint is conveyed to a condenser. There is an air duct 26 terminating in the nozzle 27 in tangential relation to the gin saws and through which a draft is created to blow the lint from the saw teeth into the duct 25 and thence into a condenser. The motes and other similar particles passing through the stripper ribs are thrown by centrifugal force into the conventional conveyance 28 by means of which they are carried away.

In the form shown in Figure 2 rotatable cleaner ribs 29 have been substituted for the stationary cleaner ribs 13 and are fixed on the transverse shaft 30 which rotates in the same direction as that of the huller saws 10. In this form the huller saws carry the seed cotton around between the rotatable ribs 29. These ribs arrest the hulls and other foreign objects and carry the same over forwardly and discharge the same downwardly through the hopper 18. The said cotton relieved of these foreign objects and the dirt, trash and the like will pass around the screen 21 and be doffed onto the gin saws by the doffer roller, as hereinabove explained.

The drawings and description disclose what are now considered to be preferred forms of the invention by way of illustration only, while the broad principle of the invention will be defined by the appended claims.

What we claim is:—

1. In a cotton gin; a huller having a hopper for receiving seed cotton, cleaning means beneath the hopper for removing the hulls and foreign objects from the cotton, said cleaning means comprising rotatable huller saws, a cleaner brush arranged to cooperate with the saws, an adjustable brush arranged to cooperate with the said saws to regulate the movement of the cotton from the huller hopper to the cleaner brush, said cleaner brush being rotatable in a direction to move the cotton downwardly, and at a peripheral speed relatively slower than that of the saws, huller ribs arranged between and at the front of the saws, said ribs being curved outwardly beyond the periphery of the saws and arranged to prevent the passage of hulls and foreign objects through between them, and the cleaner brush being effective to prevent the accumulation of, and to discharge said hulls and foreign objects retained by said ribs from said ribs, a transverse partition underneath and spaced from said saws, and doffing means behind the said partition effective to doff the cotton from the said huller saws.

2. In a cotton gin having ginning devices therein; a huller having a hopper for receiving seed cotton, cotton cleaning means between the huller and the ginning devices for removing the hulls and foreign objects from the cotton, said cleaning means comprising rotatable huller saws, a stationary brush arranged to cooperate with said saws and to retard the movement of the cotton from the huller hopper, a rotatable cleaner brush beneath the stationary brush arranged to cooperate with said saws to move the cotton downwardly, said cleaner brush being rotatable in a direction the opposite of that of the saws, and at a rate of speed slower than that of the saws, huller ribs arranged between and at the front of the saws, said ribs being provided to prevent the passage of hulls and foreign objects through them, and said cleaner brush being effective to discharge said hulls and foreign objects which are retained by said ribs.

3. In a cotton gin having ginning devices therein; a huller having a hopper for receiving said cotton, cotton cleaning means between the hopper and the ginning devices for removing the hulls and foreign objects from the cotton, said cleaning means comprising rotatable huller saws, a stationary brush arranged to cooperate with said saws and to retard the movement of the cotton from the huller hopper, a rotatable cleaner brush beneath the stationary brush arranged to cooperate with said saws to move the cotton downwardly, said cleaner brush being rotatable in a direction the opposite of that of the saws and at a rate of speed slower than that of the saws, huller ribs arranged between and at the front of the saws, said ribs being provided to prevent the passage of hulls and foreign objects through between them and said cleaner brush being effective to discharge said hulls and foreign objects which are retained by said ribs, a transverse partition underneath and spaced from said saws, and a rotatable doffer brush behind the partition and arranged to cooperate with said saws and effective to deliver cotton to the ginning devices.

THOMAS R. ALLEY.
JOSEPH D. ALLEY.